United States Patent
Chi et al.

(10) Patent No.: US 6,698,919 B2
(45) Date of Patent: Mar. 2, 2004

(54) METHOD OF UTILIZING A FIBER FOR SIMULTANEOUSLY MEASURING DISTRIBUTED STRAIN AND TEMPERATURE

(75) Inventors: Sien Chi, Hsinchu (TW); Chien-Chung Lee, Hualien (TW); Po-Wen Chiang, Kaohsiung (TW)

(73) Assignee: National Chiao Tung University, Hsinchu (TW)

( * ) Notice: Subject to any disclaimer, the term of this patent is extended or adjusted under 35 U.S.C. 154(b) by 2 days.

(21) Appl. No.: 10/118,020

(22) Filed: Apr. 9, 2002

(65) Prior Publication Data

US 2003/0103549 A1 Jun. 5, 2003

(30) Foreign Application Priority Data

Nov. 30, 2001 (TW) .......................... 90129693 A (51) Int. Cl.⁷ .......................... G01N 25/00; G01K 11/32
(52) U.S. Cl. .......................... 374/45; 374/161; 374/142; 385/12; 73/800; 356/32
(58) Field of Search .......................... 374/45, 142, 137, 374/161, 131, 117; 356/44, 301, 73.1, 35.5, 32, 33, 43; 385/12, 13, 142; 73/800; 250/227.11

(56) References Cited

U.S. PATENT DOCUMENTS

| | | | | |
|---|---|---|---|---|
| 4,773,753 A | * | 9/1988 | Hirose et al. .......................... | 356/35.5 |
| 4,842,403 A | * | 6/1989 | Tarbox et al. .......................... | 73/800 |
| 4,950,886 A | * | 8/1990 | Claus et al. .......................... | 374/161 |
| 5,191,206 A | * | 3/1993 | Boiarski et al. .......................... | 374/161 |
| 5,363,463 A | * | 11/1994 | Kleinerman .......................... | 385/12 |
| 5,564,832 A | * | 10/1996 | Ball et al. .......................... | 374/161 |
| 6,056,436 A | * | 5/2000 | Sikris et al. .......................... | 374/161 |
| 6,201,237 B1 | * | 3/2001 | Berkey et al. .......................... | 385/12 |
| 6,237,421 B1 | * | 5/2001 | Li et al. .......................... | 73/800 |
| 6,278,810 B1 | * | 8/2001 | Sirkis et al. .......................... | 385/12 |
| 6,380,534 B1 | * | 4/2002 | Farhadiroushan et al. .... | 385/13 |
| 6,573,489 B1 | * | 6/2003 | Johnson et al. .......................... | 356/32 |
| 2003/0094281 A1 | * | 5/2003 | Tubel .......................... | 385/12 |
| 2003/0174924 A1 | * | 9/2003 | Tennyson .......................... | 385/12 |

FOREIGN PATENT DOCUMENTS

| JP | 03120437 A | * | 5/1991 | .......................... 356/35.5 |
|---|---|---|---|---|

OTHER PUBLICATIONS

Parker et al., "A Fully Distributed Simultaneous Strain and Temperature Sensor Using Spontaneous Brillouin Backscatter", IEEE Photonics Technology Letters, vol. 9, Issue 7, Jul. 1997. pp. 979–981.*

Parker et al., "The Simultaneous Measurement of Strain and Temperature Distributions From Brillouin Backscatter", Optical Techniques for Smart Structures and Structural Monitoring (Digest No. 1997/033), IEE, Feb. 17, 1997, pp.1/1–1/6.*

Parker et al., "Simultaneous Distributed Measurement of Strain and Temperature From Noise–Initiated Brillouin Scattering in Optical Fibers", IEEE Journal of Quantum Electronics, vol. 34, Issue 4, Apr. 1998, pp. 645–659.*

(List continued on next page.)

Primary Examiner—Diego Gutierrez
Assistant Examiner—Mirellys Jagan
(74) Attorney, Agent, or Firm—Rosenberg, Klein & Lee (57) ABSTRACT

A method that utilizes a dispersion-shifted fiber having compound compositions with different temperature coefficients in core to simultaneously measure the distributed strain and temperature based on Brillouin frequency shift is disclosed. The present method includes the steps of obtaining mean two peak frequencies in a multi-peak Brillouin spectrum of the dispersion-shifted fiber, determining a temperature change according to the formula of a Brillouin frequency shift of the peak relating to strain and temperature conditions of the fiber, and determining a strain change through the formula. In a 3682-m sensing length of Large-Effective-Area NZ-DS fiber, a temperature resolution of 5° C., a strain resolution of 60 $\mu\epsilon$ and a spatial resolution of 2 m are achieve simultaneously.

13 Claims, 6 Drawing Sheets

OTHER PUBLICATIONS

Kurashima et al., "Strain And Temperature Characteristics of Brillouin Spectra in Optical Fibers For Distributed Sensing Techniques", 24th European Conference on Optical Communication, vol. 1, Sep. 20–24, 1998, pp. 149–150.*

Kurashima et al., "Distributed strain measurement using BOTDR improved by taking account of temperature dependence of Brillouin scattering power", 23rd European Conference on Optical Communications (Conf. Publ. No. 448), vol. 1, Sep. 22–25, 1997, pp. 119–122.*

Horiguchi et al., "Development of a distributed sensing technique using Brillouin scattering", Journal of Lightwave Technology, vol. 13, Issue 7, Jul. 1995, pp. 1296–1302.*

M.A. Davis, et al., "Simultaneous Measurement of Temperature and Strain Using Fibre Bragg Gratings and Brillouin Scattering," *IEE Proc.–Optoelectron.*, vol. 144, No. 3, pp.151–155, Jun. 1997.

N. Shibata, et al., "Longitudinal Acoustic Modes and Brillouin–Gain Spectra for $GeO_2$–Doped–Core Single–Mode Fibers," *J. Opt. Soc. Am. B*, vol. 6, No. 6, pp. 1167–1174, jun. 1989.

C. C. Lee, et al., "Measurement of Stimulated–Brillouin–Scattering Threshold for Various Types of Fibers Using Brillouin Optical–Time–Domain Reflectometer," *IEEE Photonics Technology Letters*, vol. 12, No. 6, pp. 672–674, Jun. 2000.

X. Bao, et al., "Combined Distributed Temperature and Strain Sensor based on Brillouin Loss in an Optical Fiber," *Optics Letters*, vol. 19, No. 2, pp. 141–143, Jan. 15, 1994.

* cited by examiner

METHOD OF UTILIZING A FIBER FOR SIMULTANEOUSLY MEASURING DISTRIBUTED STRAIN AND TEMPERATURE

BACKGROUND OF THE INVENTION

1. Field of Invention

The present invention relates in general to a fiber-distributed strain and temperature measurement based on the Brillouin scattering effect, more particular, to a method of utilizing a dispersion-shifted fiber for simultaneously measuring the distributed strain and temperature through Brillouin frequency shift.

2. Description of Related Art

There are two ways to fulfill the distributed sensing approach. One includes the use of single sensors being discretely arranged along a sensing line, but will make the whole sensing system much complicated. The other one as described hereinafter includes the use of optical-fiber sensors to obtain the detecting physical parameters along a linear fiber depending upon the optical characteristics thereof. Under the circumstances, the optical fiber are regarded, on one hand, as an active component for sensing measurement and, on the other hand, as a passive component for the information transmitting material to obtain the following advantages:

1. The optical fiber is small in volume and light. Thus, the optical fiber can be adopted easily anywhere.
2. Since the frequency bandwidth of the optical fiber is large, many signals may be transmitted simultaneously.
3. Since the optical fiber is made of nonconductive insulating material, it is not influenced by external electromagnetic waves. Thus, the signal may be transmitted without noise.
4. Due to the development of optical fiber technology, optical fibers can be manufactured at a low cost.

As such, the utilization of fiber-distributed sensing for the measurement of strain and/or temperature distribution is widely applied on many implementations to monitor such as tunnels, bridges, dams and airplanes, buildings and etc. for safety-secured purpose.

Recently, the fiber-distributed strain/temperature measurement based on the Brillouin scattering effect has generated significant interest in the technical community. The Brillouin frequency shift is dependent on the temperature and strain conditions of the optical fiber, which provides the basis for a sensing technique capable of detecting these two parameters. The challenge, then, is to develop a technique to distinguish their individual contributions to the change in the Brillouin frequency of the optical fiber and to avoid the cross-sensitivity problem. Several conventional techniques have been reported to accomplish the simultaneous measurement of fiber strain and temperature. In these methods, the one disclosed by X. Bao, K. J. Webb, and D. A. Jackson, published in *Opt. Lett.*, 18, 141 (1993), that uses a half of the fiber isolated from the effects of strain for temperature sensing, and another one disclosed by M. A. Davis and A. D. Kersey published in *IEE Proc.-Optoelectronic.*, 144, 151 (1997), that utilizes the fiber Bragg gratings combined with optical fiber, both require rather complicated sensing structure. Another technique disclosed by T. R. Parker, M. F. Farhadlroushan, V. A. Handerek, and A. J. Rogers, published in *IEEE Photon, Technol. Lett.*, 9, 979 (1997), that simultaneously measures the Brillouin power and frequency shift can achieve the fully distributed measurement of strain and temperature, but the temperature resolution is limited by the power measurement accuracy (~0.013 dB for 1° C.), which is very difficult to reach 0.05 dB over a considerable length of fiber and is very sensitive to environment.

SUMMARY OF THE INVENTION

It is therefore, in one aspect, an object of the present invention to provide a method that utilizes a dispersion-shifted fiber having compound compositions with different temperature coefficients in core as the sensing fiber to measure the distributed strain and temperature simultaneously. It needs only the measurement of Brillouin frequency shifts of the Brillouin spectra and can accomplish the high resolution and accuracy of temperature and strain measurement without modifying the sensing fiber.

In another aspect of the invention, it is an object to provide a method for simultaneously measuring the distributed strain and temperature without complicate detecting and calculating procedures so as to simplify the sensing system with good result of effectively distinguishing their individual contributions to the change in the Brillouin frequency of the optical fiber and successfully avoiding the cross-sensitivity problem.

According to the above-mentioned objects of the present invention, the method for simultaneous measurement of distributed strain and temperature, includes the steps of (a) providing a dispersion-shifted fiber having compound compositions with different temperature coefficients in core, (b) obtaining a multi-peak Brillouin spectrum of the dispersion-shifted fiber, (c) determining two peaks of the Brillouin spectrum having a first strain coefficient and a first temperature coefficient at a first peak frequency and a second strain coefficient and a second temperature coefficient at a second peak frequency, wherein the first strain coefficient is equal to the second strain coefficient, a Brillouin frequency shift of the peak relating to strain and temperature of the dispersion-shifted fiber, (d) calculating a temperature change from dividing a variation of the Brillouin frequency shifts of the two peaks by a variation of the first and second temperature coefficients, and (e) calculating a strain change by substituting the known temperature change into the equation of Brillouin frequency shift of the peak relating to strain and temperature of the fiber.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given herein below illustration only, and thus are not limitative of the present invention, and wherein:

FIG. 1(*a*) shows an experimental setup of test LEAF for the temperature measurement according to the present invention.

FIG. 1(*b*) shows an experimental setup of test LEAF for the strain measurement according to the present invention.

DETAILED DESCRIPTION OF THE INVENTION

In the present invention, a new method that utilizes a dispersion-shifted fiber having compound compositions with different temperature coefficients in core as the sensing fiber to simultaneously measure the distributed strain and temperature based on Brillouin frequency shift is disclosed. To prove this concept, the Large-Effective-Area Non-Zero-Dispersion-Shifted Fiber (LEAF), which has been reported by C. C. Lee and S. Chi., *IEEE Photon. Technol. Lett.*, 12, 672 (2000), to have multiple compositions in the fiber core and now intensively deployed in dense wavelength division multiplexing (DWDM) networks, is chosen as the test fiber.

A paper from N. Shibata, K. Okamoto, and Y. Azuma, published in *J. Opt. Soc. Am B*, 6, 1167 (1989) describes if an optical fiber has been compound compositions in core, the multi-peak structure in Brillouin spectrum of this optical fiber is arisen from the different acoustic velocities, which are due to different compositions or doping concentrations in core. From previous experiment of above-mentioned reference T. R. Parker et al., the Brillouin frequency shift, $v_B$, is dependent on strain and temperature of the standard single-mode fiber (SMF). In the case of an optical fiber with compound compositions in core, the Brillouin frequency shifts of the main two peaks (peak 1 and peak 2) relating to strain, $\epsilon$, and temperature, T, are given as:

$$\Delta v_B^{Pk1} = C_\epsilon^{Pk1} \Delta\epsilon + C_T^{Pk1} \Delta T \tag{1}$$

$$\Delta v_B^{Pk2} = C_\epsilon^{Pk2} \Delta\epsilon + C_T^{Pk2} \Delta T \tag{2}$$

If the strain coefficients for peak 1, $C_\epsilon^{Pk1}$, and peak 2, $C_\epsilon^{Pk2}$, have the same value and the temperature coefficients for peak 1, $C_T^{Pk1}$, and peak 2, $C_T^{Pk2}$, have different values, then the change in temperature can be given by $$\Delta T = (\Delta v_B^{Pk1} - \Delta v_B^{Pk2}) / (C_T^{Pk1} - C_T^{Pk2}) \tag{3}$$

In addition, the change in fiber strain can also be obtained by substituting the known $\Delta T$ into Eq. (1) or (2), and is given by $$\Delta\epsilon = (\Delta v_B^{Pk1} - C_T^{Pk1} \Delta T) / C_\epsilon^{Pk1} \tag{4}$$

or $$\Delta\epsilon = (\Delta v_B^{Pk2} - C_T^{Pk2} \Delta T) / C_\epsilon^{Pk2}. \tag{5}$$

Therefore, this method can provide the simultaneously distributed temperature and strain measurement along the length of the fiber link through the frequency analysis of the measured spontaneous Brillouin spectra.

Figures 1A, 1B:
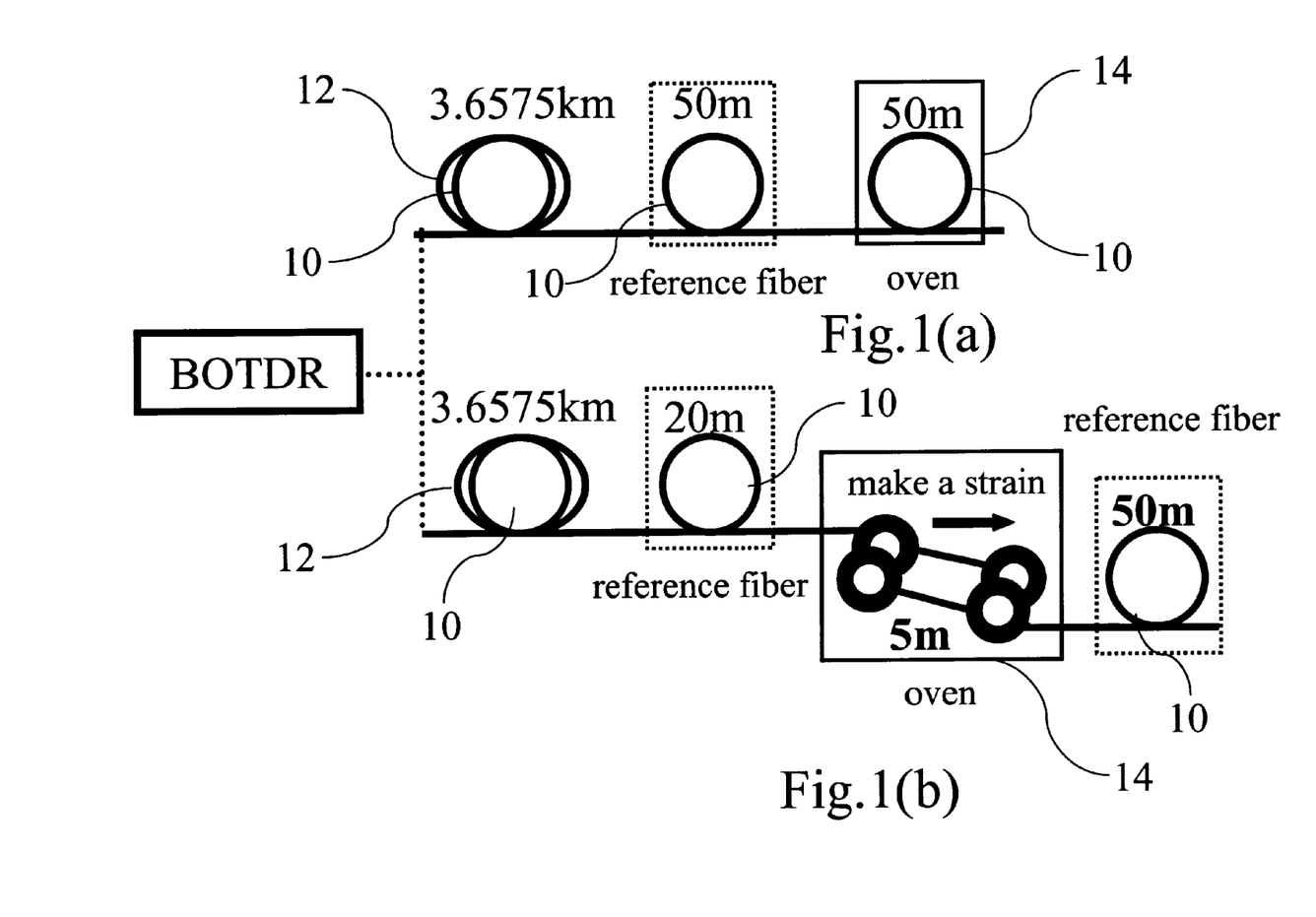
Figure 2:
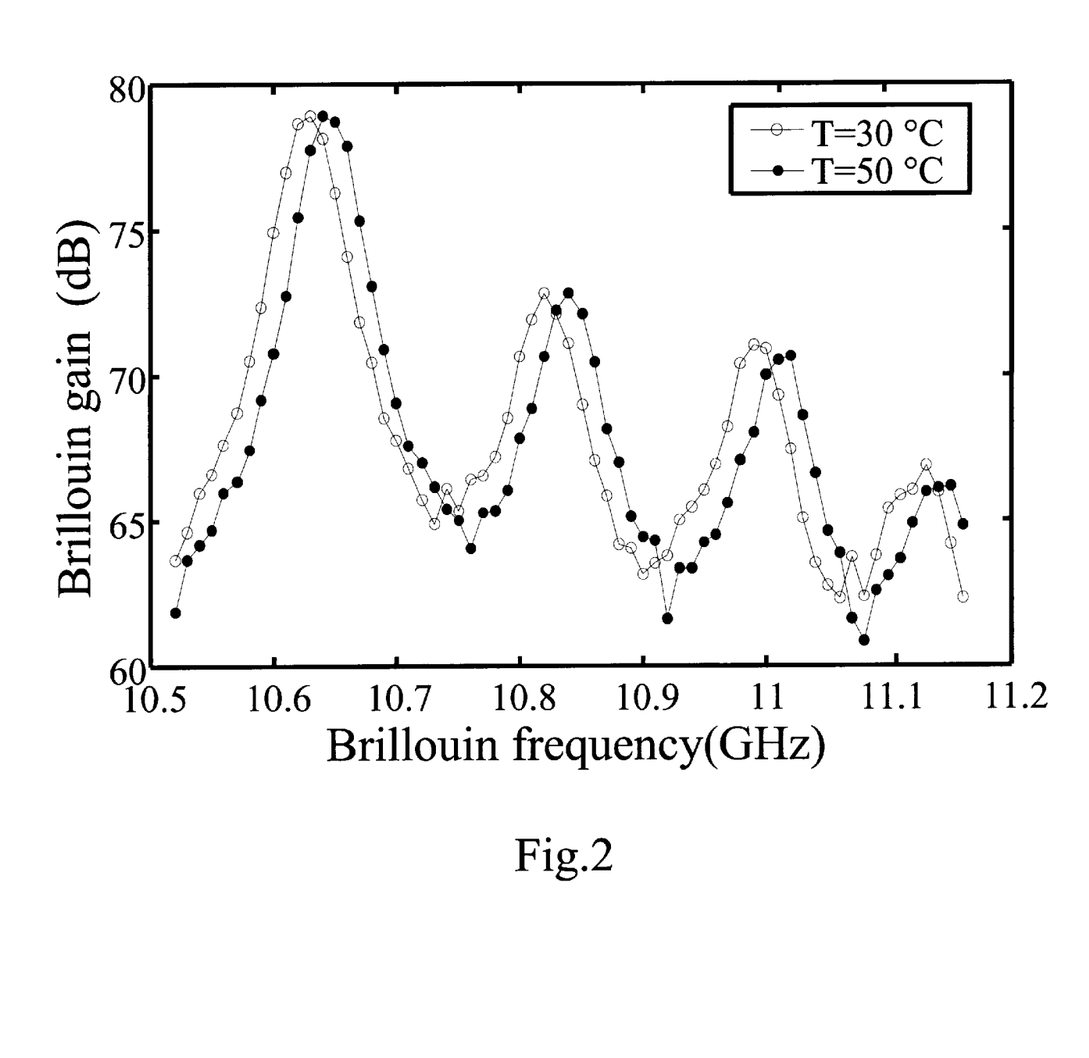
FIG. 2 shows the measured Brillouin spectra of the final 50-m LEAF in FIG. 1(*a*) at different temperatures.
Figure 3:
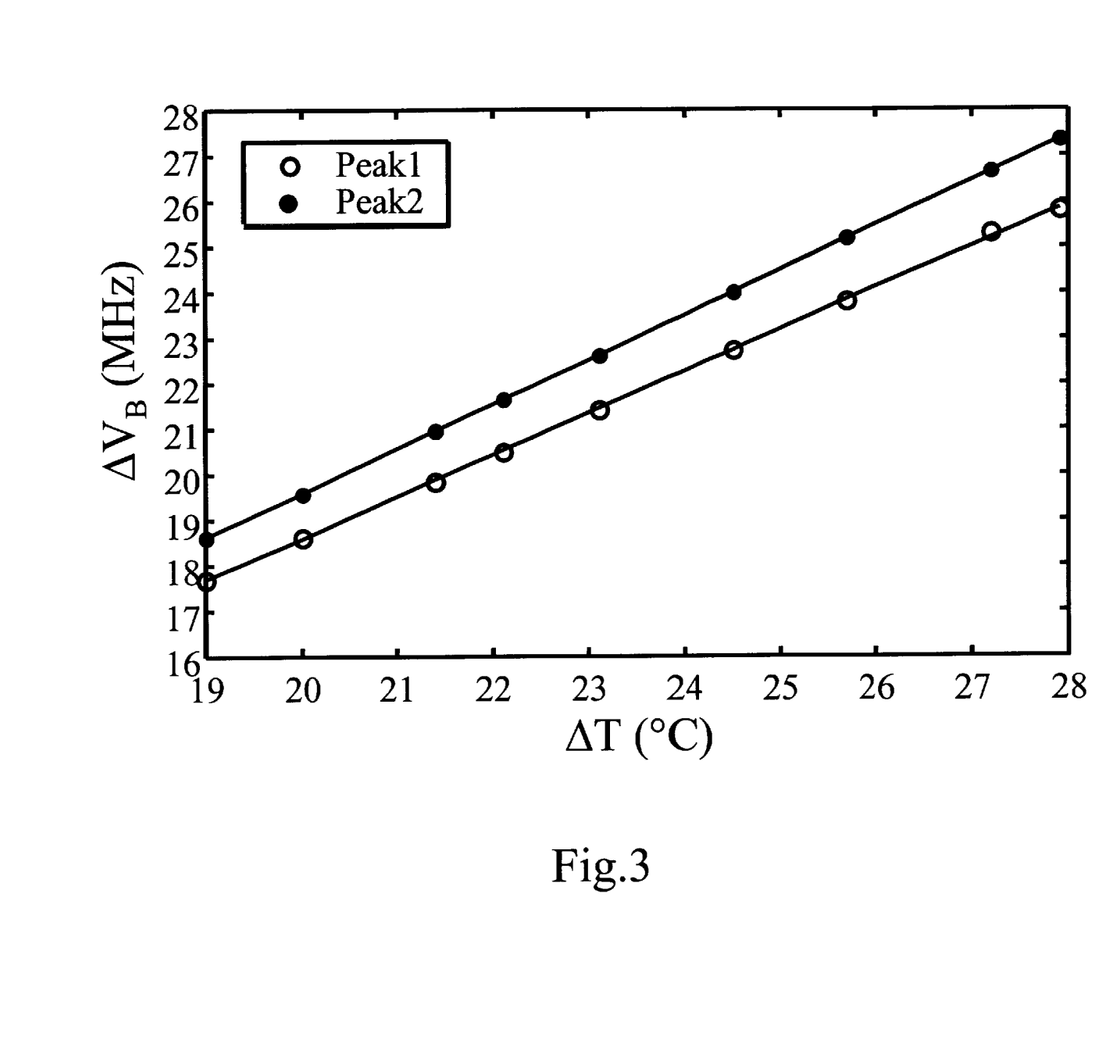
FIG. 3 shows a plot of the average Brillouin frequency shift for main two peaks in FIG. 2 versus the temperature change to determine the temperature coefficients.

FIG. 1 shows the experimental setup capable of simulating a practically long-distance fiber-distributed strain and temperature sensing. A Brillouin optical-time-domain reflectometer (BOTDR) with operating wavelength at 1554-nm is used to measure the spontaneous Brillouin spectra along the length of LEAF produced by Pirelli Company. The used LEAF 10 has the characteristics with loss coefficient of 0.21 dB/km, effective area of 70 $\mu m^2$, and dispersion of 4 ps/nm·km at 1.55 $\mu m$. For the temperature measurement, three separate sections of the test LEAF 10 are arranged as shown in FIG. 1(*a*). The first 3.6575-km LEAF 10 remained on the original spool 12 as supplied by the manufacturer, the subsequent 50-m LEAF 10 is subject to a low-level tension as a reference section, and the final 50-m LEAF 10 is placed in a thermally insulated oven 14. The operating conditions of BOTDR are as following: output power of 23 dBm, pulsewidth of 100 ns, average times of $2^{15}$, sweep frequency of 5 MHz, and spatial resolution of 2 m. The measured Brillouin spectra of the final 50-m LEAF 10 at 30° C. and 50° C. are shown in FIG. 2. The central frequencies of four peaks are 10.626, 10.820, 10.99 and 11.12 GHz for peak 1 to peak 4, respectively, in the case of 30° C. and 10.644, 10.840, 11.00 and 11.14 GHz for peak 1 to peak 4, respectively, in the case of 50° C. FIG. 3 is a plot of the average $\Delta v_B$ for peak 1 and peak 2 in the 50 m-temperature-sensing LEAF as a function of temperature change ($\Delta T$). From the data, the temperature coefficients of the Brillouin frequency shift, $C_T^{Pk1}$ and $C_T^{Pk2}$, are determined to be 0.918 and 0.98 MHz/° C., respectively. It is obviously satisfied the assumption mentioned above to have different temperature coefficients for peak 1, $C_T^{Pk1}$, and peak 2, $C_T^{Pk2}$. In addition, it can be observed that the temperature resolution is about 2° C. by using this 50-m sensing LEAF.

Figure 4:
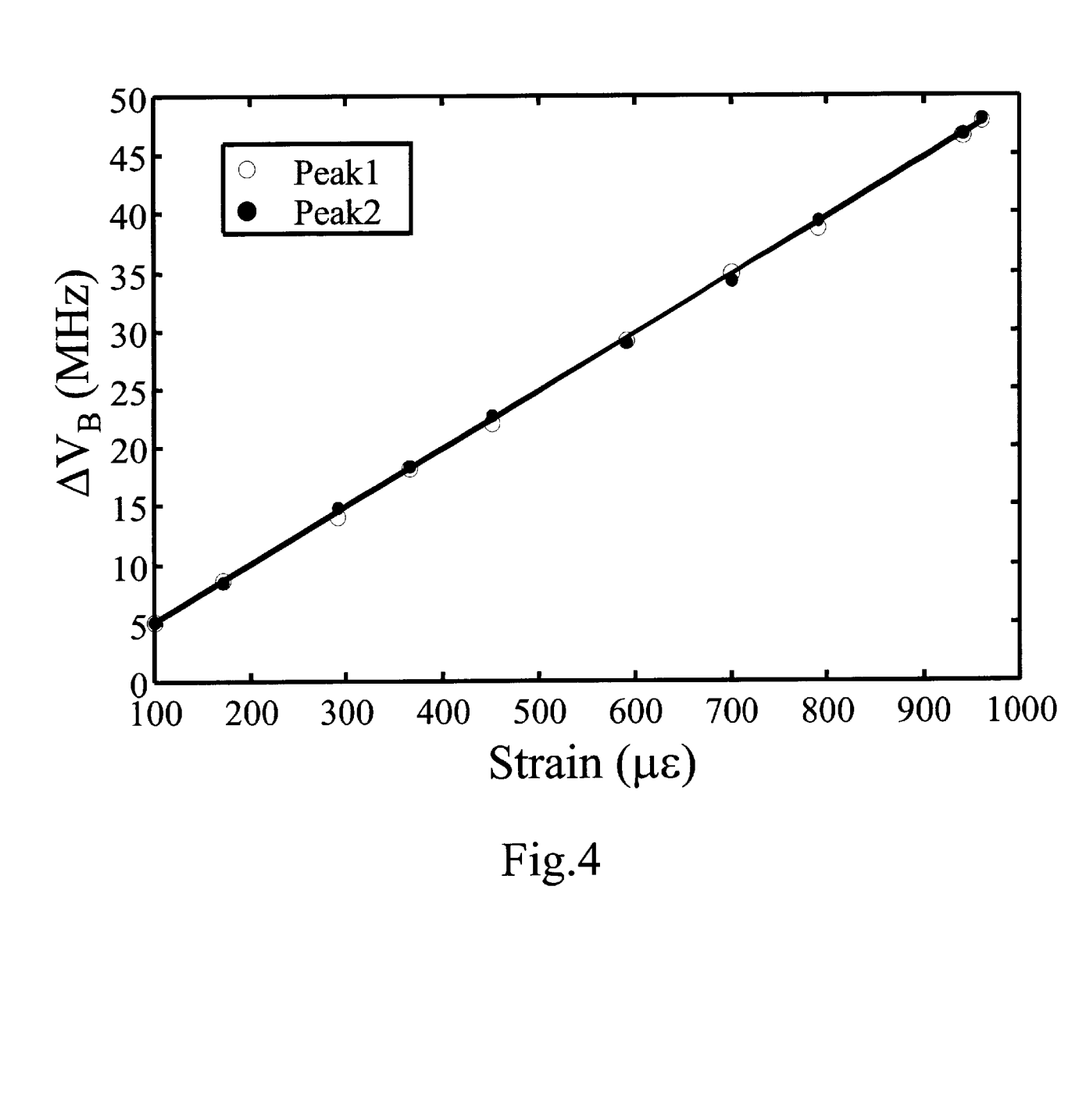
FIG. 4 shows a plot of the change in Brillouin frequency shift versus the relative fiber strain to determine the strain coefficient.

For the strain measurement, four separate sections of test LEAF 10 are arranged as shown in FIG. 1(*b*). These four LEAF section are the first 3.6575-km LEAF remained on the original spool 12, the subsequent 20-m LEAF 10 with low-level tension, the sensing 5-m LEAF 10, which is wrapped around fiber stretching unit to change the fiber strain only, in the oven 14, and the final 50-m LEAF 10 with low-level tension. The operating conditions of BOTDR are kept the same except for the pulsewidth of 20 ns. FIG. 4 shows the change in Brillouin frequency shift versus the relative fiber strain. The strain coefficient, $C_\epsilon^{Pk1}$ and $C_\epsilon^{Pk2}$, are therefore derived to be the same of 0.05 MHz/$\mu\epsilon$. It is obviously satisfied the assumption mentioned above to have the same strain coefficients for peak 1, $C_\epsilon^{Pk1}$, and peak 2, $C_\epsilon^{Pk2}$.

Figure 5:
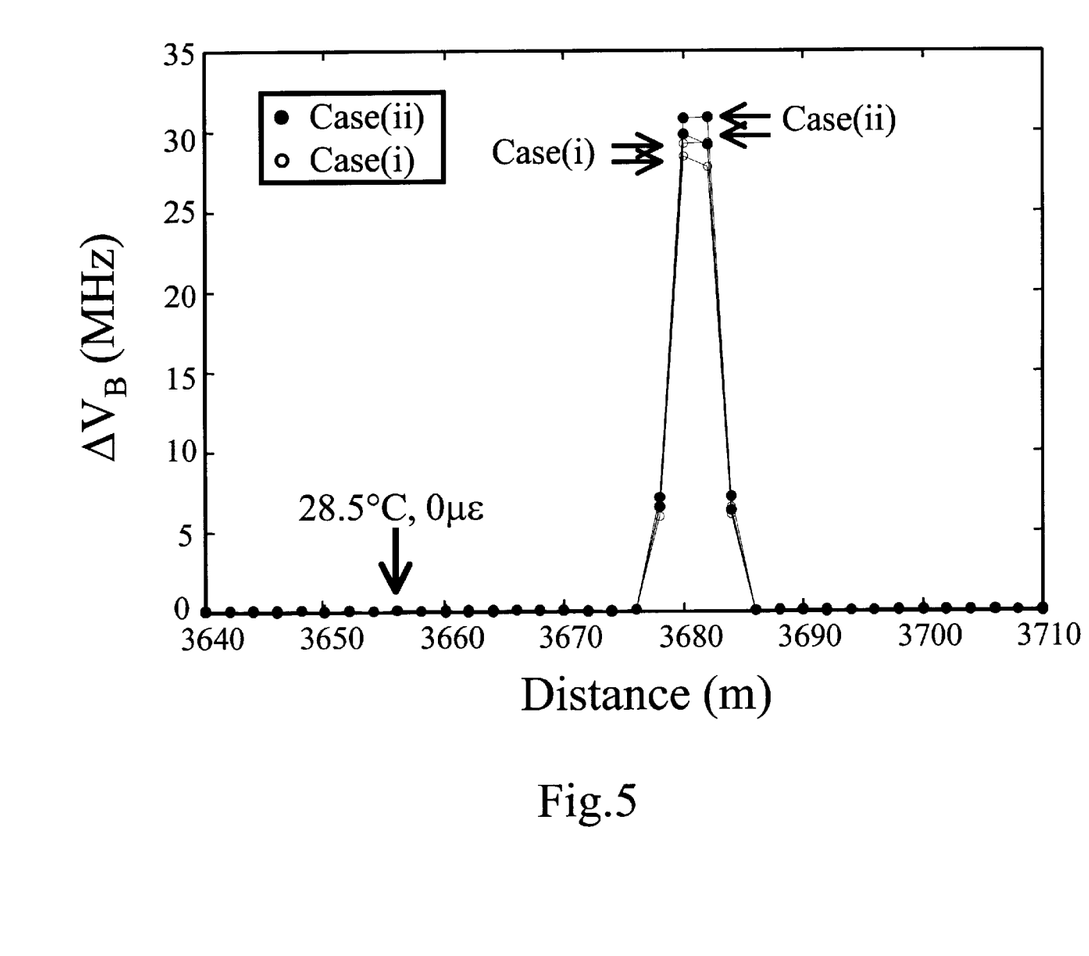
FIG. 5 shows a plot of the measured change in Brillouin frequency shift versus distance according to the present invention.
Figure 6:
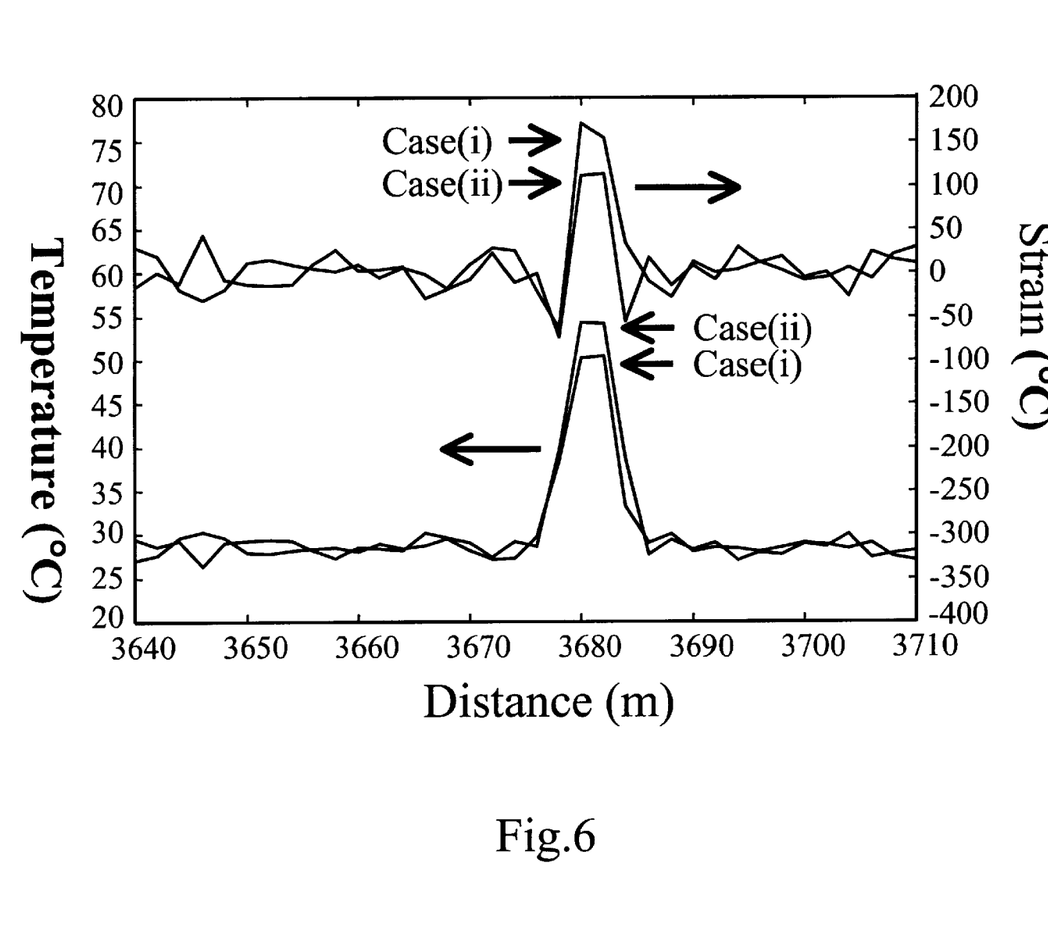
FIG. 6 shows a plot of the distributed temperature and strain versus distance according to the present invention.

To verify the feasibility of this method for simultaneous strain and temperature measurement of the distributed fiber link, two kinds of conditions for strain and temperature are applied on the 5-m section of the test LEAF in FIG. 1(*b*). These two cases of temperature and strain are: (i) 50.1° C./165 $\mu\epsilon$ and (ii) 55.1° C./104 $\mu\epsilon$, and the room temperature for reference is 28.5° C. FIG. 5 shows the measured change in Brillouin frequency shift of peak 1 and peak 2 versus distance in the testing cases (i) and (ii), respectively. By using Eqs. (3) and (4), the distributed temperature and strain in the case (i) and (ii) can be retrieved as shown in FIG. 6. For case (i), the calculated temperature/strain are 50.21° C./170.3 $\mu\epsilon$ at 3680-m length and 50.42° C./153.2 $\mu\epsilon$ at 3682-m length. For case (ii), the calculated temperature/strain are 54.3° C./110.7 $\mu\epsilon$ at 3680-m length and 54.2° C./113.1 $\mu\epsilon$ at 3682-m length. Therefore, a temperature resolution of 5° C., a strain resolution of 60 $\mu\epsilon$ and a spatial resolution of 2 m are achieved over a 3682-m sensing length. From the fluctuation of calculated temperature and strain, a temperature resolution of 2° C., a strain resolution of 20 $\mu\epsilon$ and a spatial resolution of 2 m are expected to accomplish over a 3682-m sensing LEAF.

In summary, the advantages of the present invention are as follows.

(1) A sensing fiber is used to accomplish distributed strain and temperature measurements without any auxiliaries of additional fibers so that a simple and practical sensing system is built.

(2) The determined main two peak frequencies are independent to each other for effectively distinguishing individual contributions of the strain and temperature to the change in the Brillouin frequency and to avoid the cross-sensitivity problem while the measurement is proceeded.

(3) It does not need complicate measuring or calculating procedures to obtain the strain and temperature results.

(4) It is easy by coating a more sensitive material with respect to the measurement of the strain and temperature on the dispersion-shifted fiber having compound compositions to accomplish an excellent measuring effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of utilizing a fiber for simultaneously measuring distributed strain and temperature, comprising the steps of:

providing a fiber having compound compositions with different temperature coefficients in core;

determining two peaks of the Brillouin spectrum having a first strain coefficient ($C_\epsilon^{pk1}$) and a first temperature coefficient ($C_T^{pk1}$) at a first peak frequency and a second strain coefficient ($C_\epsilon^{pk2}$) and a second temperature coefficient ($C_T^{pk2}$) at a second peak frequency, a Brillouin frequency shift ($v_B$) for each of the peaks relating to strain ($\epsilon$) and temperature (T) of the fiber;

calculating a temperature change according to a variation of the Brillouin frequency ($\Delta v_B$) shifts of the two peaks and a variation of the first and second temperature coefficients; and calculating a strain change as a function at least of the temperature change and corresponding ones of the Brillouin frequency shift, temperature coefficient, and strain coefficient for one of the two peaks.

2. The method as claimed in claim 1, wherein the strain coefficient of the first peak is as same as the strain coefficient of the second peak and the temperature coefficient of the first peak is different from the temperature coefficient of the second peak.

3. The method as claimed in claim 1, wherein the Brillouin frequency ($v_{B1}$) shift of the first peak relative to strain and temperature is given by:

$$\Delta v_{B1}=C_\epsilon^{pk1}\times\Delta\epsilon+C_T^{pk1}\times\Delta T.$$

4. The method as claimed in claim 1, wherein the Brillouin frequency ($v_{B2}$) shift of the second peak relative to strain and temperature is given by:

$$\Delta v_{B1}=C_\epsilon^{pk1}\times\Delta\epsilon+C_T^{pk1}\times\Delta T.$$

5. The method as claimed in claim 1, wherein the temperature change relative to the Brillouin frequency shifts and the temperature coefficients is given by:

$$\Delta T=(\Delta\|_{B1}-\Delta v_{B2})/(C_T^{pk1}-C_T^{pk2}).$$

6. The method as claimed in claim 1, wherein the strain change is calculated as follows:

$$\Delta\epsilon=(\Delta v_{B1}-C_T^{pk1}\Delta T)/C_{\epsilon pk1}.$$

7. The method as claimed in claim 1, wherein the strain change is calculated as follows:

$$\Delta\epsilon=(\Delta v_{B2}-C_T^{pk2}\Delta T)/C_\epsilon^{pk2}.$$

8. A method of utilizing a fiber for simultaneously measuring distributed strain and temperature, comprising the steps of:

providing a dispersion-shifted fiber having compound compositions with different temperature coefficients in core;

determining two peaks of the Brillouin spectrum having a first strain coefficient ($C_{\epsilon1}$) and a first temperature coefficient ($C_{T1}$) at a first peak frequency and a second strain coefficient ($C_{\epsilon2}$) and a second temperature coefficient ($C_{T2}$) at a second peak frequency, wherein a Brillouin frequency shift ($v_B$) at each of the peaks relates to strain ($\epsilon$) and temperature (T) of the fiber;

calculating a temperature change according to a variation of the Brillouin frequency ($\Delta v_B$) shifts of the two peaks, while the strain coefficient of the first peak is equivalent to the strain coefficient of the second peak and the temperature coefficient the first peak is different from the temperature coefficient of the second peak, and a variation of the first and second temperature coefficients; and calculating a strain change as a function at least of the temperature change and corresponding ones of the Brillouin frequency shift, temperature coefficient, and strain coefficient for one of the two peaks.

9. The method as claimed in claim 8, wherein the Brillouin frequency ($v_{B1}$) shift of the first peak relative to the strain and temperature is given by:

$$\Delta v_{B1}=C_{\epsilon1}\times\Delta\epsilon+C_{T1}\times\Delta T.$$

10. The method as claimed in claim 8, wherein the Brillouin frequency ($v_{B2}$) shift of the second peak relative to the strain and temperature is given by:

$$\Delta v_{B2}=C_{\epsilon2}\times\Delta\epsilon+C_{T2}\times\Delta T.$$

11. The method as claimed in claim 8, wherein the temperature change relative to the Brillouin frequency shifts and the temperature coefficients is given by:

$$\Delta T=(\Delta v_{B1}-\Delta v_{B2})/(C_{T1}-C_{T2}).$$

12. The method as claimed in claim 8, wherein the strain change is calculated as follows:

$$\Delta\epsilon=(\Delta v_{B1}-C_{T1}\Delta T)/C_{\epsilon1}.$$

13. The method as claimed in claim 8, wherein the strain change is calculated as follows:

$$\Delta\epsilon=(\Delta v_{B2}-C_{T2}\Delta T)/C_{\epsilon2}.$$

* * * * *